United States Patent [19]

Fukuda et al.

[11] 4,301,908

[45] Nov. 24, 1981

[54] ANTIVIBRATION DEVICE FOR A CLUTCH PEDAL

[75] Inventors: Syozi Fukuda, Tokyo; Teruo Munakata, Koganei; Masashi Matsuki, Akishima, all of Japan

[73] Assignee: Nissan Motor Co., Ltd., Yokohama, Japan

[21] Appl. No.: 76,473

[22] Filed: Sep. 17, 1979

[30] Foreign Application Priority Data

Nov. 22, 1978 [JP] Japan .............................. 53-145052

[51] Int. Cl.³ ............................................ F16D 25/12
[52] U.S. Cl. .............................. 192/109 F; 192/30 V; 92/60; 188/380
[58] Field of Search ............. 192/109 F, 30 V, 111 A, 192/111 B, 112 C, 110 R, 99 A, 85 R; 138/26; 60/583, 586, 587, 591, 592; 92/60; 303/87; 188/1 B; 180/293, 300; 183/152

[56] References Cited

U.S. PATENT DOCUMENTS

| 2,161,670 | 6/1939 | Freeman et al. ................. 180/293 |
| 2,967,396 | 1/1961 | Staadt .................................. 60/54.5 |
| 3,331,398 | 7/1967 | Goss ..................................... 138/26 |
| 4,188,073 | 2/1980 | Ishikawa et al. ..................... 303/87 |

Primary Examiner—George H. Krizmanich

[57] ABSTRACT

An antivibration device for a clutch pedal in a clutch operating mechanism wherein upon depressing the clutch pedal a hydraulic pressure is caused in a master cylinder, which in turn actuates an operating cylinder to operate a withdrawal lever, the device having an oil damper provided in a hydraulic passage communicating between the master and operating cylinders, thereby absorbing fluctuations in hydraulic pressure in the operating cylinder caused by engine vibrations to prevent vibration of the clutch pedal.

5 Claims, 3 Drawing Figures

ANTIVIBRATION DEVICE FOR A CLUTCH PEDAL

BACKGROUND OF THE INVENTION

1. Field of the Invention

The present invention relates to an antivibration device for a clutch pedal of a clutch operating mechanism.

2. Description of the Prior Art

In a hydraulic clutch operating mechanism, as publicly known, a clutch pedal is depressed by a driver to cause a hydraulic pressure in a master cylinder which actuates an operating cylinder to operate a withdrawal lever of a clutch. With such a hydraulic clutch operating mechanism, vibrations of an engine are propagated through the withdrawal lever to the operating cylinder. The thus propagated vibrations cause fluctuations (pulsations) in hydraulic pressure in the passage between the operating cylinder and the master cylinder, which in turn cause the clutch pedal connected to the master cylinder to vibrate. This vibration increases substantially in proportion to the engine revolutions. This problem is particularly acute in diesel engines which are likely to vibrate.

In order to solve this problem the passage communicating between the operating and master cylinders has been partially made of a readily expansible rubber hose to obtain a damping effect with the aid of the resilience of the rubber hose. In this case, however, the following disadvantages arise with the rubber hose approach to the problem.

(1) Since the expansive amounts of the rubber hose caused by hydraulic pressures are irregular, all the rubber hoses to be used must be selected through hydraulic pressure resistance tests which increases production costs.

(2) The rubber hose is apt to change in quality because it is in direct contact with the oil and exposed to the high temperature atmosphere in an engine compartment. Accordingly, the vibration damping capacity of the rubber hose is unstable.

(3) When an oil is introduced into the hydraulic passage, an air purge is needed in the passage. In air purging, the rubber hose is apt to collapse, which then results in a time-consuming and troublesome operation. Moreover, there is a tendency for air bubbles to stay in the passage, so that the air purge cannot be completely effected. The oil thus mixed with the air bubbles can cause troubles such as an incomplete disconnection of a clutch adapted to be operated by the oil.

(4) The inventors of this application have found in their experiments that the vibration damping effect using rubber hoses rapidly decreases at engine speeds higher than 2,500 rpm, beyond which speed effective antivibration for a clutch pedal cannot be effected.

SUMMARY OF THE INVENTION

It is an object of the invention to provide an improved antivibration device for a clutch pedal which eliminates the above drawbacks in the prior art.

It is another object of the invention to provide an antivibration device for a clutch pedal which comprises an oil damper capable of absorbing fluctuations in hydraulic pressure in an operating cylinder caused by engine vibrations to ensure the minimum vibration of the clutch pedal.

It is a further object of the invention to provide an antivibration device which is able to effect smoothly an air purge in filling the hydraulic system with oil.

These and other objects are accomplished by the present invention, wherein the antivibration device for a clutch pedal of a clutch operating mechanism including a master cylinder in which a hydraulic pressure arises by depressing said clutch pedal and an operating cylinder actuated by said hydraulic pressure caused in the master cylinder to operate a withdrawal lever, according to the invention comprises an oil damper provided in a hydraulic passage communicating said master cylinder with said operating cylinder.

The invention will be more fully understood by referring to the following detailed specification and claims taken in connection with the appended drawings.

DETAILED DESCRIPTION OF THE PREFERRED EMBODIMENT

Figure 1:
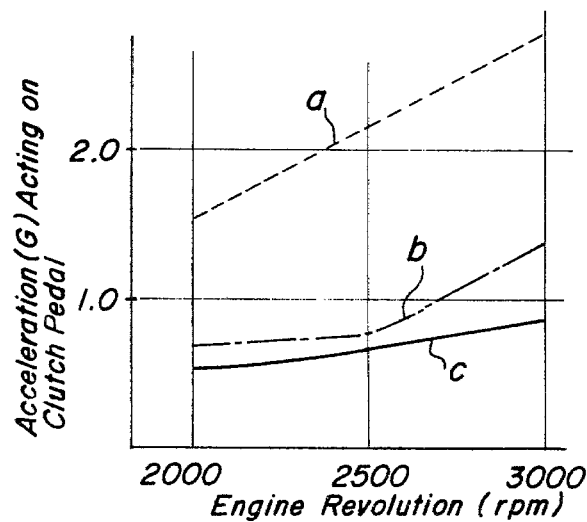
FIG. 1 is a graph illustrating relationships between engine revolutions and accelerations acting upon clutch pedals, wherein lines a and b represent prior art solutions and a line c represents the results of tests with the device according to the present invention.

FIG. 1 illustrates relationships between engine revolutions and accelerations acting on clutch pedals by vibrations of engines. In conventional clutch operating mechanisms, the vibrations of clutch pedals increase in substantially in proportion to engine revolutions as shown in dotted line a. In clutch operating mechanisms using the partially expansive hoses above mentioned, their vibration damping capacities rapidly decrease at engine speeds higher than 2,500 rpm as shown in a dot-and-dash line b, so that any effective prevention of clutch vibration cannot be accomplished. This does not apply, however, to the device of the present invention, as can be seen from line c of FIG. 1.

Figure 2:
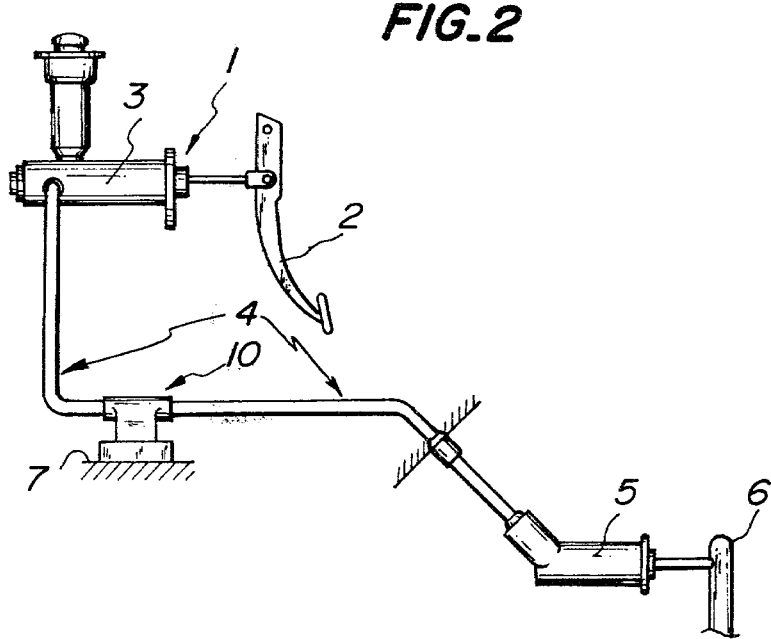
FIG. 2 is an elevation showing schematically a clutch operating mechanism provided with the device according to the invention.

Referring to FIG. 2 illustrating a clutch operating mechanism 1 provided with the device according to the invention, the mechanism 1 comprises a clutch pedal 2, a master cylinder 3 connected to the clutch pedal 2, and an operating cylinder 5 connected to the master cylinder 3 through a hydraulic passage 4 including clutch hoses which hardly expand in comparison with rubber hoses. Upon depressing the clutch pedal 2 by a driver a hydraulic pressure is caused in the master cylinder 3, which is introduced through the hydraulic passage 4 into the operating cylinder 5 which is thus operated to actuate a withdrawal lever 6.

According to the invention an oil damper 10 is provided in the hydraulic passage 4 to absorb the fluctuation in hydraulic pressure in the operating cylinder 5 caused by vibrations of an engine thereby preventing the fluctuation in hydraulic pressure from propagating to the master cylinder 3.

Figure 3:
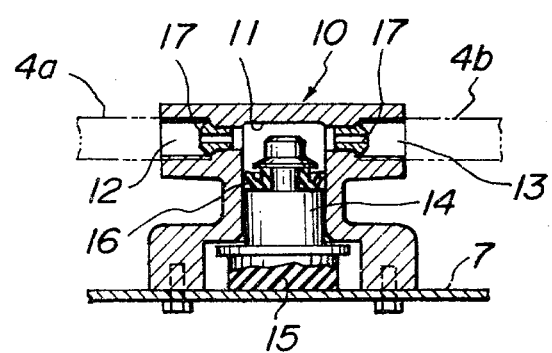
FIG. 3 is a sectional view in elevation of one embodiment of the oil damper 10 of FIG. 2 used in the device according to the invention.

As shown in FIG. 3, the oil damper 10 is fixed to a member 7 constituting a vehicle body and comprises an oil chamber 11 having ports 12 and 13 connected to an oil passage 4a on the side of the master cylinder 3 and a flexible oil passage 4b on the side of the operating cylinder 5, respectively, a piston 14 fitted in the oil chamber 11 vertically slidable as viewed in FIG. 3, and a resilient member 15 arranged below the piston 14 for absorbing the fluctuation in hydraulic pressure in the oil chamber 11 through the piston 14. In this embodiment, the resilient member 15 is a rubber spring. It may be a coil spring. The piston 14 is provided with a sealing cup 16.

In the event that vibrations of the engine are propagated or transmitted through the withdrawal lever 6 to the operating cylinder 5 to cause the fluctuation (pulsation) in hydraulic pressure in the operating cylinder 5, the fluctuation is transmitted through the passage 4b on the side of the operating cylinder 5 to the oil chamber 11 of the oil damper 10 where the piston 14 moves reciprocally in response to the fluctuation in the hydraulic cylinder to cause the rubber spring 15 to be compressed and restored. The repeated compression and restoration of the resilient member 15 absorbs the fluctuation in hydraulic pressure. In the ports 12 and 13 of the oil chamber 11 are arranged orifice forming members 17, respectively which cause a pressure drop therebetween resulting in more effective absorption of the fluctuation in hydraulic pressure. In this embodiment, the diameter of the orifices is 2.5 mm when the hydraulic passage 4 has an inner diameter of 3.2 mm.

It has been found in the inventor's experiments with the above arrangement that the acceleration G acting upon the clutch pedal is much lower as shown in line c of FIG. 1 than that of the clutch operating mechanism of the prior art using rubber hoses (new hoses) as shown in line b, which means the antivibration effect has been improved according to the invention. It has also been found that the acceleration does not rapidly increase even at high rotating speeds of the engine more than 2,500 rpm to obtain antivibration characteristics stable over wide rotating speeds of the engine.

With the device of this embodiment, moreover, since a stroke loss of the clutch pedal 2 or an amount of hydraulic fluid to be displaced from the master cylinder 3 in excess of that to be displaced from the operating cylinder 5 depends only upon a spring constant of the rubber spring 15 of the oil damper 10, a properly determined spring constant for the rubber spring can achieve a lower stroke loss of the clutch pedal 2 and thus, a stable clutch connecting operation and stable vibration prevention of the clutch pedal. The most suitable spring constant for the rubber spring is 28–36 kg/mm in consideration of the vibration absorbing effect and stroke loss of the clutch. Furthermore, the oil damper may be applied to various kinds of vehicles by providing various rubber springs having different spring constants.

The rubber spring 15 is not in contact with oil, so that its characteristic is retained unvaried to maintain the superior antivibration effect for many years. Since no rubber surface is in direct contact with the oil other than the sealing cup 16, bubbles seldom or never stay in the hydraulic pressure passages in purging the air when the oil is introduced into the system, so that an air purge can be rapidly effected with ease.

As can be seen from the above description, the device according to the invention achieves the practical advantage of securely preventing any vibration in the clutch pedal by providing the oil damper in the hydraulic passage, which effectively absorbs the fluctuation in hydraulic pressure in the operating cylinder due to the engine vibration to cut off the transmission of the fluctuation to the master cylinder.

While the invention has been particularly shown and described with reference to preferred embodiments thereof, it will be understood by those skilled in the art that the foregoing and other changes in form and details can be made therein without departing from the spirit and scope of the invention.

What is claimed is:

1. An antivibration device for a clutch pedal of a clutch operating mechanism including a master cylinder in which a hydraulic pressure is created by depressing said clutch pedal, an operating cylinder actuated by said hydraulic pressure caused in the master cylinder to operate a withdrawal lever and an oil damper provided in a hydraulic passage communicating said master cylinder with said operating cylinder, wherein said oil damper comprises an oil chamber having ports connected to passages to said master cylinder and said operating cylinder, respectively, a piston slidably fitted in said oil chamber, a resilient member for absorbing fluctuations in hydraulic pressure in said oil chamber through said piston and orifice-forming members disposed in said ports of the oil chamber, respectively, to cause a pressure drop therebetween.

2. An antivibration device as set forth in claim 1, wherein said piston is slidable perpendicularly to a passage between said ports of the oil chamber and said resilient member is positioned in contact with said piston on an outer side thereof.

3. An antivibration device as set forth in claim 1, wherein said resilient member is a rubber spring.

4. An antivibration device as set forth in claim 3, wherein the spring constant of said rubber spring is with the range of from about 28–36 kg/mm.

5. An antivibration device as set forth in claim 1, wherein the diameter of the orifices in said orifice-forming members is approximately 2.5 mm when said hydraulic passage communicating said master cylinder with said operating cylinder has an inner diameter of about 3.2 mm.

* * * * *